UNITED STATES PATENT OFFICE.

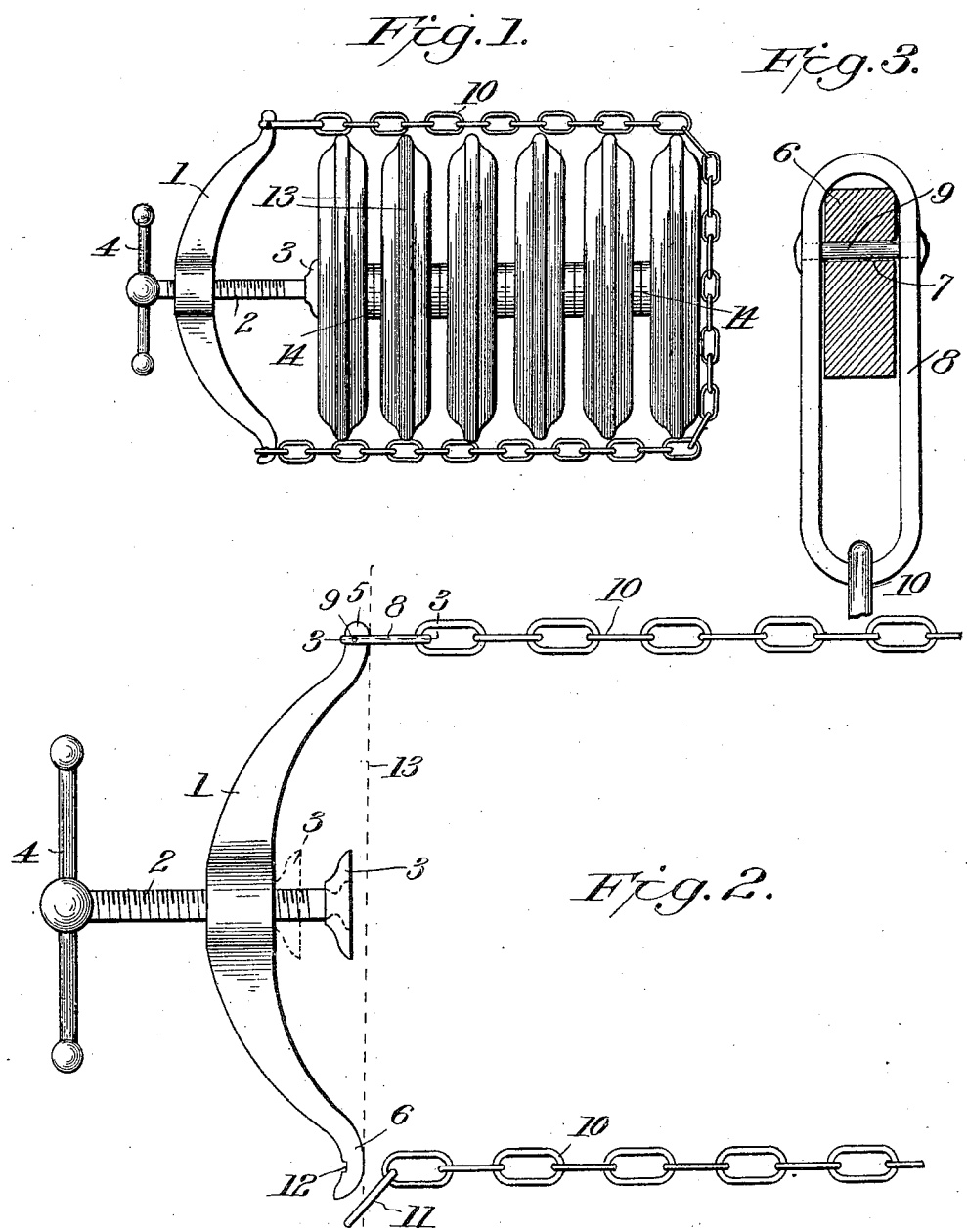

HERMAN L. E. PETERSON, OF ELGIN, ILLINOIS.

PRESSING DEVICE FOR PUSH-NIPPLE RADIATORS.

942,410.

Specification of Letters Patent.  Patented Dec. 7, 1909.

Application filed April 18, 1908. Serial No. 427,945.

*To all whom it may concern:*

Be it known that I, HERMAN L. E. PETERSON, a citizen of the United States, residing at Elgin, in the county of Kane and State of Illinois, have invented certain new and useful Improvements in Pressing Devices for Push-Nipple Radiators, of which the following is a specification, reference being had therein to the accompanying drawing.

This invention relates to means for pressing the parts of a push-nipple radiator together.

The object of the invention is the provision of means for facilitating the assembling of the different parts of a radiator, involving the placing of push-nipples in place between the sections and pressing these nipples for holding the sections together.

Another object of the invention is the improvement of the construction of a pressing or clamping device employed in the assembling of the parts of a radiator, which device comprises a minimum number of parts, is durable and efficient in operation, and comparatively inexpensive to manufacture.

With these and other objects in view, this invention consists of certain novel constructions, combinations, and arrangements of parts, as will be hereinafter fully described and claimed.

In the drawings: Figure 1 is a plan view of a device constructed in accordance with the present invention, and showing the same positioned upon a radiator. Fig. 2 is an enlarged, fragmentary view of the device depicted in Fig. 1. Fig. 3 is a sectional view, taken on line 3, 3, Fig. 2.

Referring to the drawings by numerals, 1 comprises the body of a yoke, through which is threaded a rotatable member 2, and said rotatable member is provided at its inner end with a clamp plate 3; at the outer end of the rotatable member is a rod or grip 4. The body of the yoke 1 terminates at its ends in comparatively straight portions 5 and 6. The portion 5 is provided with a transverse aperture 7, Fig. 3, which aperture is adapted to register with similarly constructed apertures in link 8, through which registering apertures any suitable fastening means, as for instance, rivet or bolt 9, may be positioned for securing link 8 upon end 5 against accidental displacement. By reason of this fastening means, the chain 10 will not be removed, under normal conditions, off of end 5, when said chain is thrown around the radiator prior to the assembling of the sections thereof, thereby facilitating the operation of the device, as it will only be necessary for the operator to hook link 11 at the opposite end of the chain over the comparatively straight, horizontal end 6, and drop said link 11 into the shallow, transverse notch or socket 12, formed therein, prior to the threading of the rotatable member 2 inward upon the body 1, for causing the clamp plate 3 to engage and press against the inner or end section 13 of the radiator.

When it is desired to bring the sections of the radiator together, the device is placed around the sections thereof, and said device is constituted by the chain, surrounding two sides and one end of the radiator, and the yoke and its coöperating parts, which yoke and coöperating parts surround one end of the radiator. By a slight movement outward of the rotatable member or bolt 2 upon the yoke, caused by threading the same, the chain can be quickly detached, as link 11 need only be lifted out of the notch or socket 12, for the end 6 is not provided with a hook or deep socket which would increase the trouble of assembling the device, or disassembling the same from the sections of a radiator. Furthermore, by reason of the bowed structure of the yoke, the plate 3 can be moved against the body and inside of an imaginary line (see dotted line 13) drawn in the same plane in which the bottom of the ends 5 and 6 are formed, thereby placing the plate 3, when not in use, in a pocket and out of the way of the sectioned radiator while the device is being assembled thereon, prior to the pressing of the sections together, which will cause the push-nipples to be compressed in portions of the sections, and, consequently, hold said sections together.

From the foregoing description, it will be obvious that I have provided a simple device, having a flexible, surrounding member or chain, which is adapted to be quickly placed around a plurality of sections and instantaneously pressing upon one of the straight ends of the yoke for assembling said flexible member or chain in an operative position upon the device to be clamped.

I have illustrated in Fig. 1 parts of a sectional radiator for illustrating the manner in which my device is placed thereon for clamping sections of the radiator together, for causing the push-nipples to be compressed in portions 14, as is common in the art.

The notch 12 is of importance in the structure, as it securely fastens a link of the chain upon end 6, when the chain is stretched taut, and, besides, the notch 6 does not increase the cost of construction, which is of importance in the manufacture of the device, as it can be quickly cut in the end 6 by an ordinary file, obviating the use of additional material for producing fastening means upon the yoke, and also removing the undesirable feature of a hook that would tend to interfere with the assembling or disassembling of the detachable end of the chain with the yoke.

What I claim is:

A clamping-device for assembling radiator-sections, comprising a yoke having an outstanding straight-end and an end with a hook-portion, said straight-end being provided with a transverse pivot-aperture and the hook-portion of the other end provided with a transverse shallow holding-notch formed in the socket of the hook-portion, a plunger threaded through the central portion of the yoke and carrying a pressing-head upon its inner end, a chain having one of its end-links straddling said straight-end and said end-link provided with registering apertures which aline with the pivot-apertures through said straight-end of the yoke, said apertures in the end-link being formed near one end thereof for permitting free pivotal movement of the end-link upon the straight-end relative to the longitudinal axis of the yoke and also of free movement of the contiguous link of the chain carried by the end-link, and a rivet passing through the alined openings of the end-link and the pivot-aperture of the yoke for fixedly holding the chain upon the yoke and in pivotal relation thereto, the other end of the chain being adapted for quick adjustment upon the yoke and securely retained in the shallow-notch during operation of the clamping-device.

In testimony whereof I hereunto affix my signature in presence of two witnesses.

HERMAN L. E. PETERSON.

Witnesses:
   ESTER E. WILSON,
   FRANK W. JOSLYN.